United States Patent
Cohen

(10) Patent No.: US 11,616,719 B2
(45) Date of Patent: Mar. 28, 2023

(54) TECHNIQUES FOR DETERMINING CLIENT-SIDE EFFECTS OF SERVER-SIDE BEHAVIOR USING CANARY ANALYSIS

(71) Applicant: NETFLIX, INC., Los Gatos, CA (US)

(72) Inventor: Michael Lloyd Cohen, Santa Cruz, CA (US)

(73) Assignee: NETFLIX, INC, Los Gatos, CA (US)

( * ) Notice: Subject to any disclaimer, the term of this patent is extended or adjusted under 35 U.S.C. 154(b) by 873 days.

(21) Appl. No.: 14/922,101

(22) Filed: Oct. 23, 2015

(65) Prior Publication Data
US 2017/0118110 A1 Apr. 27, 2017

(51) Int. Cl.
G06F 8/65 (2018.01)
H04L 45/42 (2022.01)
G06F 11/36 (2006.01)
H04L 67/01 (2022.01)

(52) U.S. Cl.
CPC ........... H04L 45/42 (2013.01); G06F 8/65 (2013.01); G06F 11/368 (2013.01); H04L 67/01 (2022.05)

(58) Field of Classification Search
CPC .................. H04L 45/52; G06F 8/65
USPC ........................................... 709/238
See application file for complete search history.

(56) References Cited

U.S. PATENT DOCUMENTS

| 8,990,778 B1 | 3/2015 | Allocca et al. |
| 2007/0083654 A1* | 4/2007 | Yotsugi .................. H04L 67/06 709/226 |
| 2010/0299732 A1* | 11/2010 | Zhang .................... G06F 21/52 726/6 |
| 2011/0289507 A1 | 11/2011 | Khan et al. |

(Continued)

FOREIGN PATENT DOCUMENTS

| CN | 102725763 A | 10/2012 |
| CN | 103116532 A | 5/2013 |

(Continued)

OTHER PUBLICATIONS

Plumbee Engineering: "How we do Canary Deployments—Plumbee engineering", Nov. 15, 2013, XP055330344, Retrieved from the Internet: URL: http://engineering.plumbee.com/blog/2013/11/15/how-we-do-canary-deployments/.

(Continued)

Primary Examiner — Sibte H Bukhari
(74) Attorney, Agent, or Firm — Artegis Law Group, LLP

(57) ABSTRACT

In one embodiment of the present invention, a sticky canary router routes each request associated with a service to either a canary cluster of servers that implement a modification to the service or a baseline cluster of servers that do not implement the modification. The sticky canary router implements a mapping algorithm that determines the routing of each request based on a current time, a time window for the routing, and a characteristic of the request. Notably, the mapping algorithm may be implemented such that, for time (Continued)

segments with duration equal to the time window, the sticky canary router routes all requests received from a particular device in a consistent fashion—either to the canary cluster or to a baseline cluster. Configured thusly, the sticky canary router enables the analysis of approximately full sections of client interactions with the canary servers, thereby facilitating identification of client-side effects of the changes.

18 Claims, 5 Drawing Sheets

(56) References Cited

U.S. PATENT DOCUMENTS

| | | | | |
|---|---|---|---|---|
| 2014/0379901 A1* | 12/2014 | Tseitlin | ................... | H04L 43/08 709/224 |
| 2016/0014027 A1* | 1/2016 | Oran | ..................... | H04L 45/742 709/213 |

FOREIGN PATENT DOCUMENTS

| | | |
|---|---|---|
| CN | 103853662 A | 6/2014 |
| CN | 104871131 A | 8/2015 |
| JP | 2007-287098 A | 11/2007 |
| WO | 2014/093660 A1 | 6/2014 |

OTHER PUBLICATIONS

International Search Report for International Application No. PCT/US2016/057521 dated Jan. 5, 2017.

Anonymous: "Load balancing (computing)" Wikipedia, URL:https://en.wikipedia.org/w/index.php?title=Load_balancing_(computing)&oldid=686092130, Oct. 16, 2015, pp. 1-7.

Swidler, Shlomo, "Elastic Load Balancing with Sticky Sessions", URL:https://web.archive.org/web/20140812014718/http://shlomoswidler.com/2010/04/elastic-load-balancing-with-stickysessions.html, Apr. 8, 2010, pp. 1-13.

Baptiste Assmann: "Load Balancing, Affinity, Persistence, Sticky Sessions: What You Need to Know", URL:https://web.archive.org/save/https://www.haproxy.com/fr/blog/load balancing-affinity-persistence-sticky-sessions-what-you-need-to-know/, Mar. 29, 2012, pp. 1-13.

* cited by examiner

TECHNIQUES FOR DETERMINING CLIENT-SIDE EFFECTS OF SERVER-SIDE BEHAVIOR USING CANARY ANALYSIS

BACKGROUND OF THE INVENTION

Field of the Invention

Embodiments of the present invention relate generally to computer science and, more specifically, to techniques for determining client-side effects of server-side behavior using canary analysis.

Description of the Related Art

Many service providers supply services via a client-server architecture in which clients request services via client devices and, in response, servers provide services. For example, Netflix is a service provider that supplies on-demand streaming video to clients. The clients submit requests, such as requesting to playback particular videos, via client devices, and Netflix servers execute software in response to the requests to deliver the videos to the client devices. The clients may enter the requests using any supported client devices, such as video game consoles, televisions, handheld devices, etc.

As part of improving the client experience, service providers frequently deploy software updates that introduce new features, improve existing features, and/or fix defects. More specifically, the service providers "push out" the software updates to the servers and, subsequently, the servers execute the updated software. In an attempt to ensure that the client experience is not adversely affected by the software updates, service providers typically employ a variety of testing methods to validate the software updates prior to deploying the software updates. However, manually testing the software updates on all supported types of client devices through all client work flows is usually extremely difficult and time consuming, if not impossible. For instance, Netflix on-demand streaming video services supports numerous Blu-ray Disc players, numerous tablet computers, numerous mobile phones, numerous high-definition television receivers, numerous home theatre systems, numerous set-top boxes, numerous video game consoles, and so forth. Consequently, the amount of time required to exhaustively test a software update using each supported type of client device is unacceptable long. Further, if a defect that is introduced by a software update is not detected and corrected prior to deployment of the software update, then the client experience may be degraded.

In one approach to reducing the impact of undetected defects that are introduced by software updates, some service providers use a deployment process known as canary analysis. In canary analysis, a service provider pushes out a software update to a relatively small percentage of "canary" servers, while a relatively large percentage of "baseline" servers remain unchanged—executing the baseline (i.e., non-updated) software. Because the software update is tested on only a limited number of servers, if a defect is introduced by the software update, then a relatively small percentage of requests associated with relatively few client devices are impacted.

As the canary servers and baseline servers operate, the service provider measures operations of the servers to gauge the effects of the software update. In general, the results of such measurements are referred to as "server-side metrics." By comparing the server-side metrics associated with the canary servers to the server-side metrics associated with the baseline servers, the service provider may detect anomalies that are indicative of one or more defects that have been introduced by the software update. For example, suppose that a software update introduces additional latency. During canary analysis, the server-side metrics could indicate that the latency associated with the canary servers significantly exceeds the latency associated with the baseline servers. Upon making this determination, the service provider could then modify the software update to eliminate the additional latency prior to pushing out the final software update to all of the servers.

However, while canary analysis may detect anomalies in the operations of the canary servers, thereby mitigating the risk associated with deploying a software update, some defects introduced by a software update can elude detection via the canary analysis process described above. In particular, during canary analysis, the availability of the baseline software may mask the effects of the software update on the operations of the client devices. For example, suppose that a particular client device issues a request that is received by a canary server and then the canary server executes the updated software to generate a response to the request. Further, suppose that a defect associated with the updated software causes the canary server to malfunction such that the particular client device is unable to interpret the response. In a conventional canary analysis process, the particular client device would retry the request, and because relatively few of the servers implementing the service are canary servers, a baseline server most likely would receive this second request. The baseline server would execute the baseline software and, consequently, correctly process the second request to generate a response to the second request. Because the particular client device would be able to correctly interpret the response to the second request, the server-side metrics would not indicate a problem associated with the software update. Consequently, the defect would effectively elude detection.

Such undetected effects of server behavior on the operations of client devices, referred to herein as client-side effects of server-side behavior, may include data differences, format changes, empty server responses, etc. In operation, if a software update that introduces an undetected defect were to pass canary analysis, then the service provider could end up pushing out the software update to all the servers, unaware of the defect. Because the baseline software would no longer be available, the defect in the software update could negatively impact the client experience across multiple types of client devices.

As the foregoing illustrates, what is needed in the art are more effective techniques for detecting defects when testing changes to software that executes on server machines.

SUMMARY OF THE INVENTION

One embodiment of the present invention sets forth a computer-implemented method for routing requests when performing a canary analysis. The method includes computing a first mapping based on at least one characteristic of a first request, a time associated with the first request, and a time window for a routing; determining whether the first mapping indicates that the first request is to be associated with a modification to a service provided via servers; and routing the first request to either a first server that implements the modification or a second server that does not implement the modification based on whether the first mapping indicates that the first request is to be associated with the modification.

One advantage of the disclosed techniques for routing requests is that a service provider may leverage these techniques to comprehensively analyze the effects of the modification to the service on both the client experience and the server behavior. In particular, to monitor the client-side effects of the modification, the services provider may configure the time windows such that requests from a subset of client devices are consistently routed to servers that implement the modification for approximately full client sessions. Because the client devices included in the subset are unable to access the service without the modification for the duration of the time window, the service provider may gather metrics that enable the service provider to analyze the effects of the modification on the client devices.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

System Overview

Figure 1A:
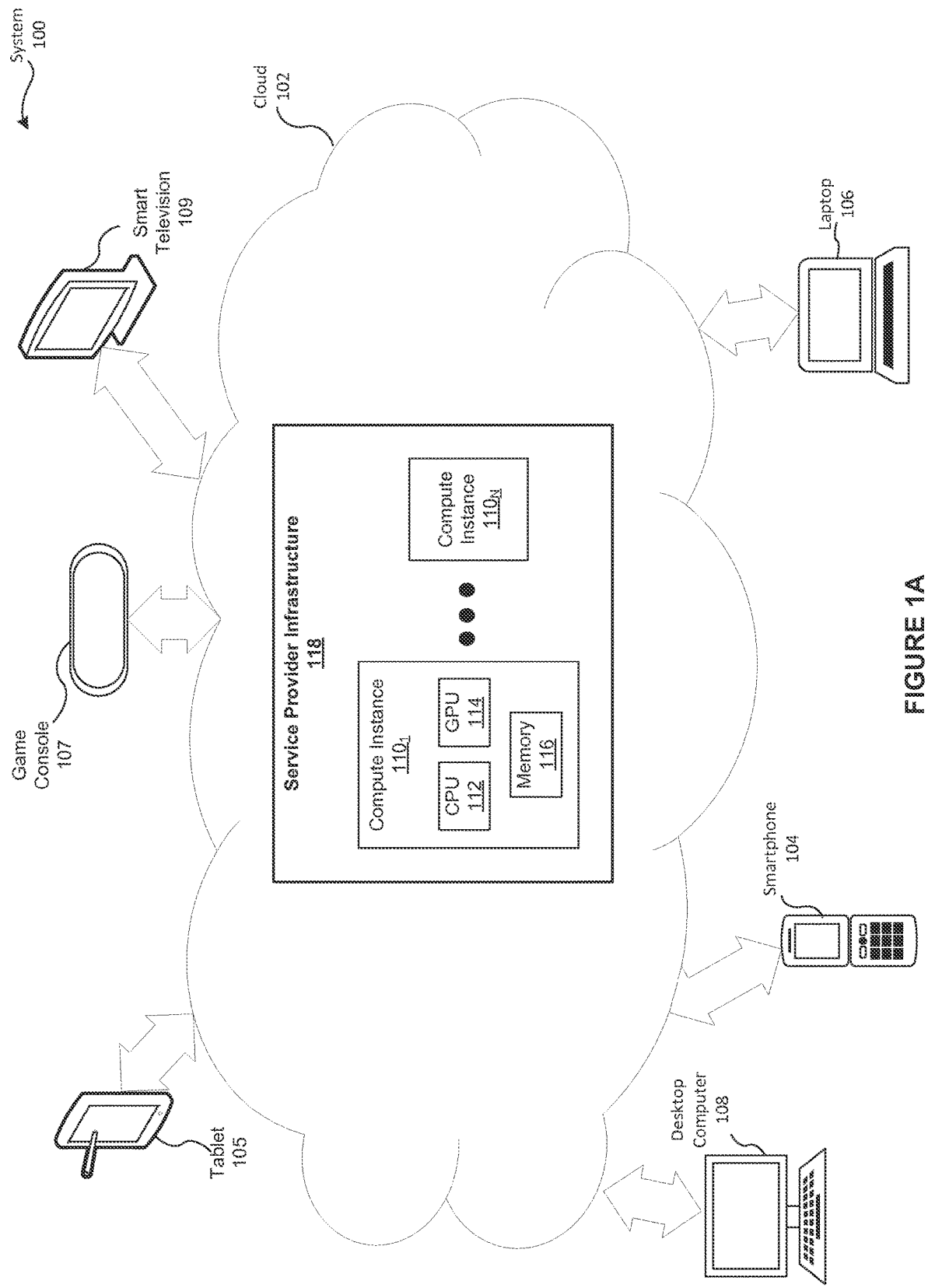
FIG. 1A is a conceptual illustration of a system configured to implement one or more aspects of the present invention.

FIG. 1A is a conceptual illustration of a system 100 configured to implement one or more aspects of the present invention. As shown, the system 100 includes, without limitation, a cloud 102 (e.g., encapsulated shared resources, software, data, etc.) connected to a variety of client devices capable of interacting with the cloud 102. Such client devices include, without limitation, a desktop computer 108, a laptop 106, a smartphone 104, a smart television 109, a game console 107, a tablet 105, television-connected devices (not shown), handheld devices (not shown), and streaming entertainment devices (not shown).

The cloud 102 may include any number of compute instances 110 configured with any number (including zero) of central processing units (CPUs) 112, graphics processing units (GPUs) 114, memory 116, etc. In operation, the CPU 112 is the master processor of the compute instance 110, controlling and coordinating operations of other components included in the compute instance 110. In particular, the CPU 112 issues commands that control the operation of the GPU 114. The GPU 114 incorporates circuitry optimized for graphics and video processing, including, for example, video output circuitry. In various embodiments, the GPU 114 may be integrated with one or more of other elements of the compute instance 110. The memory 116 stores content, such as software applications and audio-visual data, for use by the CPU 112 and the GPU 114 of the compute instance 110. In operation, the cloud 102 receives input client information from a client device (e.g., the laptop 110), one or more of the compute instances 110 operate on the client information, and the cloud 102 transmits processed information to the client device.

In alternate embodiments, the cloud 102 may be replaced with any type of cloud computing environment. In other embodiments, the system 100 may include any distributed computer system instead of the cloud 102. In yet other embodiments, the system 100 does not include the cloud 102 and, instead, the system 100 includes a single computing unit that implements any number of processing units (e.g., central processing units and/or graphical processing units in any combination).

In general, the compute instances 110 included in the cloud 102 are configured to implement one or servers that execute one or more applications. As shown, the compute instances $110_1$-$110_N$ are configured as servers that are included in a server provider infrastructure 118.

Figure 1B:
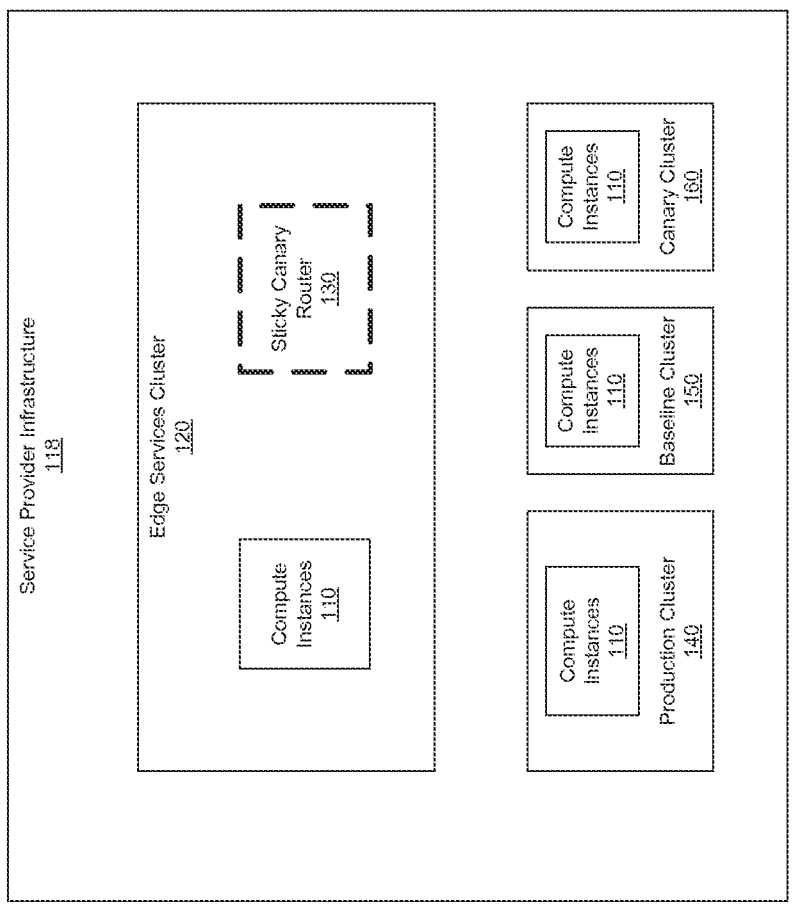
FIG. 1B is a more detailed illustration of the service provider infrastructure of FIG. 1A, according to various embodiments of the present invention.

FIG. 1B is a more detailed illustration of the service provider infrastructure 118 of FIG. 1A, according to various embodiments of the present invention. As shown, the service provider infrastructure 118 includes, without limitation, an edge services cluster 120, a production cluster 140, a baseline cluster 150, and a canary cluster 160. The edge services cluster 120, the production cluster 140, the baseline cluster 150, and the canary cluster 160 includes one or more of the compute instances 110 configured as servers. For explanatory purposes, the servers included in the production cluster 140 are referred to herein as production servers, the servers included in the baseline cluster 150 are referred to herein as baseline servers, and the servers included in the canary cluster 160 are referred to herein as canary servers.

In operation, the client devices issue requests as part of client sessions that interact with a service that is implemented in the service provider infrastructure 118. In response to the requests, servers included in the service provider infrastructure 188 execute software and issue responses to the requests. Each client session includes a group of behavior that is intended to accomplish one or more related tasks. For example, suppose that the service is a video distribution service and a client device is the laptop 106. A client session could include the requests issued by the laptop 106 to the service provider infrastructure 118 from the time the client loaded a graphical user interface (GUI) generated by servers included in the service provider infrastructure 118 until the time the client selected a video for playback.

In operation, the edge services cluster 120 acts as a gateway to the servers that implement the service. Among other things, the edge service cluster 120 receives requests from the client devices and routes the requests to servers that execute software that implements the service. Typically, as part of improving the client experience, a service provider periodically changes the software associated with the service. More specifically the service provider pushes out a software update that modifies the software that is implemented by the servers. Typically the service provider attempts to detect any defects introduced by a software update associated with as service prior to pushing out the software update. However, oftentimes the numerosity of the supported types of client devices and/or the numerosity of the work flows of the clients makes comprehensive testing infeasible. For this reason, the edge service cluster 120 is configured to enable canary analysis.

As part of canary analysis, upon receiving a request, the edge service cluster 120 routes the request to one of the production cluster 140, the baseline cluster 150, or the canary cluster 160. Each of the production cluster 140 and the baseline cluster 150 includes servers that execute the software associated with the service without the software update to issue responses to requests. For explanatory purposes, the software associated with the service without the software update is referred to herein as the "baseline service software." By contrast, the canary cluster 160 includes servers that execute the software update associated with the service to issue responses to requests. For explanatory purposes, the software update associated with the service is referred to herein as the "service software update." As persons skilled in the art will recognize, in some embodiments, a software update associated with a service may be applied in addition to the baseline software to create an aggregated service software update. For explanatory purposes, a service software update and an aggregated service software update are both referred to herein as service software updates.

As the servers included in the baseline cluster 150 and the canary cluster 160 execute requests, the edge service cluster 120 captures and analyzes the operation of the servers and/or the client devices via one or more canary metrics. The canary metrics are designed to facilitate detection of unexpected effects introduced by the service software update. For example, the canary metrics could reflect, without limitation, the number and/or type of server errors, latencies introduced by the servers, loading of the servers, dynamics of the CPUs 112, and so forth. In general, for each of the canary metrics, the edge service cluster 120 compares values associated with the baseline cluster 160 to values associated with the canary cluster 170 to identify any anomalies that indicate that the service software update implemented in the canary cluster 170 may negatively impact the client experience.

The edge service cluster 120 may capture and analyze the canary metrics in any technically feasible fashion. For example, in some embodiments, the edge service cluster 120 may operate in conjunction with an event stream processing system (not shown) to analyze response streams and device logs. More specifically, the edge service cluster 120 may "tag" each request that the edge service cluster 120 routes to either the baseline cluster 150 or the canary cluster 160. The event stream processing system may be configured to identify tagged requests and correlate device logs and response streams based on an identifying characteristic of the tagged request, such as an electronic serial number (ESN) that identifies the client device that issued the request.

Based on the analyzing the canary metrics, the edge service cluster 120 provides canary data regarding any identified anomalies or errors to the service provider. The canary data may include any type of information about the anomalies or errors including, without limitation, client device types, percentage of requests affected, etc. Based on the canary data, the service provider may determine whether to expand the push out of the service software update or "pull back" the service software update. The service provider may pull back the service software update in any technically feasible fashion. For example, the service provider could reconfigure any number of the servers to execute the baseline service software instead of the service software update. In some embodiments, the service provider may push out a new service software update that corrects the identified anomalies or errors. The service provider may analyze the canary data in any technically feasible fashion. For example, in some embodiments, the service provider may configure an Automated Canary Analytics (ACA) tool to interpret the canary data.

If, however, the service provider determines that the canary data does not indicate that the service software update implemented in the canary cluster 160 may negatively impact the client experience, then the service provider may push out the services software update to additional servers, thereby increasing the size of the canary cluster 160. Eventually, if the canary data continues to indicate that the services software update implemented in the canary cluster 160 does not negatively impact the client experience, then the service provider may push out the service software update to production—configuring the servers included in the production cluster 140 to execute the service software update instead of the baseline service software.

Further, in some embodiments, the edge service cluster 120 may provide an application programming interface (API) that enables the service provider to modify the canary analysis. For example, such an API could enable the service provider to retrieve canary data, start the canary analysis, stop the canary analysis, configure the canary analysis, and so forth. In yet other embodiments, if the edge service cluster 120 detects an anomaly that indicates that the service software update implemented in the canary cluster 160 may negatively impact the client experience, then the edge service cluster 120 may automatically stop the canary analysis, thereby limiting the impact of the changes.

In general, the quality of the canary metrics impacts the effectiveness of the canary analysis. More specifically, if one or more defects included by the software service update are not reflected in the canary metrics, then the service provider may push out the software services update, including the defects, to the production cluster 140. Subsequently, the defects may negatively impact an unacceptable number of clients. One limitation of a conventional edge services cluster that reduces the quality of the canary metrics is the random routing process implemented by a conventional edge services cluster.

A conventional edge services cluster typically routes a relatively small random sampling of the requests to the canary cluster 160. Because the baseline software is still available and is executed by the servers included in the baseline cluster 150 and the production cluster 140, a random sampling process may mask the effects of the service software update on the operations of the client devices. In particular, the canary metrics may not reflect adverse effects on the operations of client devices that are attributable to the differences between the behavior of the servers included in the canary cluster 160 and the baseline cluster 150. Such undetected effects of server behavior on the operations of client devices, referred to herein as client-side effects of server-side behavior, may include data differences, format changes, empty server responses, etc.

For example, suppose that the canary cluster 160 includes 6 canary servers, the baseline cluster 150 includes 6 baseline servers, and the production cluster 140 includes 988 production servers. During a client session, if a client device issues 30 requests and a conventional edge services cluster routes the requests, then the likelihood that one of the canary servers would process one of the requests would be about 3%. Further, suppose that the conventional edge services cluster routes a first request to a canary server. The canary server executes the service software update, but a defect associated service software update causes the canary server to malfunction and issue a response to the first request that the client device is unable to interpret. In response, suppose that the client device retries the request by issuing a second request.

If the conventional edge services cluster routes the second request, then the likelihood that one of the canary servers would process the second request would be about 0.09%. If one of the baseline servers or the product servers processes the second request and executes the baseline software to generate a second response to the second request, then the client device would be able to correctly interpret this second response. Consequently, the canary metrics would not indicate a problem and the defect could elude detection until the service provider pushes out the changes to the production cluster 140. After the service provider pushes out the changes to the production cluster 140, if the client device issues the first request, then the production cluster 140 would execute the service software update and the client device would not be able to correctly interpret the response irrespective of the number of retries. Consequently the client experience would be degraded.

To enable the detection of such client-side effects of changes during canary analysis, the edge services cluster 120 includes a sticky canary router 130. In general, the sticky canary router 130 consistently routes requests received from a small percentage of the client devices, for a limited amount of time, to either the canary cluster 160 or the baseline cluster 150 for canary analysis. The limited amount of time is referred to herein as the time-to-live (TTL) and is typically selected to capture approximately full client sessions. The TTL is also referred to herein as the time window for a routing. The edge services cluster 120 routes the remaining requests to the production cluster 140. The sticky canary router 130 may be implemented in any technically feasible fashion. For example, in some embodiments, the sticky canary router 130 may be implemented as one or more filters included in the edge services cluster 120.

In operation, for a time segment of a duration that equals the TTL, the sticky canary router 130 routes requests from a small subset of the client devices to the canary cluster 160 and a different small subset of the client devices to the baseline cluster 150. For a subsequent time segment of a duration that equals the TTL, the sticky canary router 130 routes requests from yet another small subset of the client devices to the canary cluster 160 and a different small subset of the client devices to the baseline cluster 150. The sticky canary router 130 continues this process, routing requests from different subsets of the client devices to either the canary cluster 160 or the baseline cluster until the canary analysis is finished. The sticky canary router 130 may be configured to terminate the canary analysis based on any technically feasible criterion, such as a total time.

For explanatory purposes only, for a given TTL, the small subset of client devices for which the sticky canary router 130 routes requests to the canary cluster 160 are referred to here as "canary client devices." Similarly, for a given TTL, the small subset of client devices for which the sticky canary router 130 routes requests to the baseline cluster 150 are referred to herein as "baseline client devices." The remaining client devices are referred to herein as "production client devices." As time progresses, the set of client devices referred to as canary client devices, the set of client devices referred to as baseline client devices, and the set of client devices referred to as production client devices change.

Advantageously, by consistently routing requests based on the associated client device, the sticky canary router 130 enables the edge services cluster 120 to obtain canary metrics that accurately and comprehensive reflect interactions with the canary cluster 160 for entire client sessions. Consequently, client-side effects of the changes that elude detection via conventional canary analysis may be determined via the canary metrics. In particular, if the changes cause an undesirable client-side effect, then the canary metrics typically reflect that the call patterns associated with the canary client devices differ from the call patterns associated with the baseline client devices.

In particular, because the sticky canary router 130 isolates the requests that are received from the canary client devices from the baseline software for the duration of the TTL, the baseline software does not mask the effects of the service software update on the canary client devices. For example, suppose that the TTL is ninety seconds and a canary client device issues a first request that the sticky canary router 130 routes to the canary cluster 160. The canary server included in the canary cluster 160 executes the service software update, but a defect associated with the service software update causes the canary server to malfunction and issue a response to the first request that the client device is unable to interpret. In response, suppose that the client device retries the request by issuing a second request. The sticky canary router 130 routes this second request to the canary cluster 160 and a canary server executes the service software update. The service software update includes the defect and, consequently, the client device is unable to interpret the response of the canary server to the second request.

The client device could continue to retry the request for the TTL of ninety seconds, but since the sticky canary 130 would not route any of the requests received from the client device to either the baseline cluster 150 or the production cluster 140 during the TTL, the client device would be unable to successfully operate. Notably, as a result of the defect included in the service software update, the volume of requests received by the canary cluster 160 could dramatically exceed the volume of requests received by the baseline cluster 150. Since the increase in volume would be reflected in the canary metrics, the service provider could detect the defect included in the service software update via the sticky canary analysis, pull back the service software update, and fix the defect.

Further, because the sticky canary router 130 is configured to route only a small percentage of the client devices to the canary cluster 160 for the limited TTL, the impact of the canary testing on the client experience is minimized. For example, the sticky canary router 130 could be configured to route requests from 3% of the client devices to the canary cluster 160 for a TTL of ten seconds. After ten seconds, the sticky canary router 130 could route requests from a different 3% of the client devices to the canary cluster 160 for the next ten seconds, and so forth for a total canary testing time of two minutes. Consequently, the impact on each client device of any defect included in the service software update would be limited to ten seconds.

Note that the techniques described herein are illustrative rather than restrictive, and may be altered without departing from the broader spirit and scope of the invention. In particular, the sticky canary router 130 may implement any algorithm that enables the sticky canary router 130 to consistently route requests to either the canary cluster 160 or the baseline cluster 150 based on any technically feasible criterion and for any length of time. For example, in alternate embodiments, the canary router 130 may select the requests to route to the canary cluster 160 based on a device identifier, a client identifier, an electronic serial number (ESN), a session identifier, or any other characteristic of the request. In some embodiments, the canary router 130 may route requests from one session executing on a particular client device to the canary cluster 160 and route requests from other sessions executing on the particular client device to the production cluster 140.

Further, in some embodiments, the system 100 does not include the edge services cluster 120 and the sticky canary router 130 is implemented as a stand-alone routing application. In alternate embodiments, the functionality included in the sticky canary router 130 may be included in any unit or application and implemented in any technically feasible fashion. In various embodiments, the sticky canary router 130 may be implemented in software, hardware, or any combination thereof. In some embodiments, the service software update may be replaced with any type of modification that alters the functionality of the server that implements the modification. For example, in some embodiments, the service software update is replaced with a service update that includes any number and combination of software updates, data updates, scripting updates, template updates, and so forth.

Sticky Canary Routing

Figure 2:
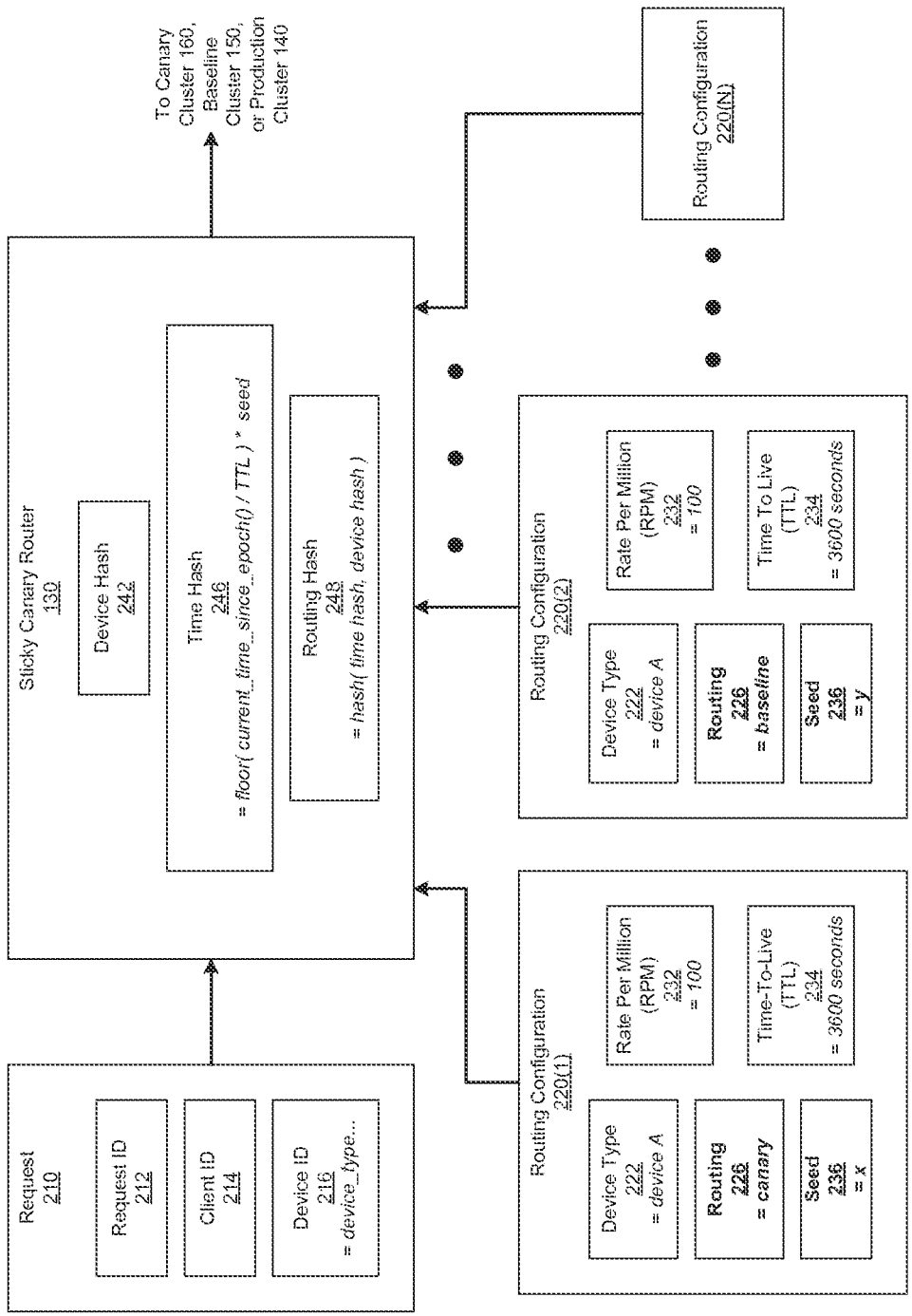
FIG. 2 is a more detailed illustration of the sticky canary router of FIG. 1B, according to various embodiments of the present invention.

FIG. 2 is a more detailed illustration of the sticky canary router 130 of FIG. 1, according to various embodiments of the present invention. As shown, the sticky canary router 130 includes, without limitation, a device hash 242, a time hash 246, and a routing hash 248. In operation, the sticky canary router 130 receives one or more requests 210, and processes each of the requests 210 based on one or more routing configurations 220. The sticky canary router 130 then collaborates with the edge services cluster 120 to route each of the requests to one of the canary cluster 160, the baseline cluster 150, or the production cluster 140.

As shown, the request 210 includes without limitation, a request identifier (ID) 212, a client ID 214, and a device ID 216. The request ID 212, the client ID 214, and the device ID 216 may be specified in any technically feasible fashion and adhere to any convention as known in the art. For example, the device ID 216 may be a string that includes a device type concatenated with a device serial number. In alternate embodiments, the request 210 may include any number and type of information that identifies any number of characteristics associated with the request. For example, in some embodiments, the request 210 may include an electronic serial number (ESN) and a session identifier.

The sticky canary router 130 is configured via the routing configurations 220. Each of the routing configurations 220 includes, without limitation a device type 222, a routing 226, a rate per million (RPM) 232, a time-to-live (TTL) 234, and a seed 236. The device type 222 specifies a type of device, such as a PlayStation®3 (PS3) or a Best Resolution Audio Visual Integrated Architecture Internet Video Link (BIVL) television. The routing 226 specifies whether the routing configuration 220 is associated with the canary cluster 160 or the baseline cluster 150. The rate per million (RPM) 232 specifies the percentage of the requests 210 that are received from the client devices of the device type 222 that are to be routed to the cluster specified by the routing 226. The TTL 234 specifies the duration of the time segments during which a particular subset of client devices are routed to the cluster specified by the routing 226 based on the device IDs 216. Finally, the seed 236 is a value that is unique to each of the routing configurations 220 and is selected to ensure that the subset of client devices that the sticky canary router 130 routes according to the routing configurations 220 varies between the routing configurations 220.

Notably, the routing configurations 220 enable the functionality included in the sticky canary router 130 to be fine-tuned based on a variety of logistical considerations. In some embodiments, the routing configurations 220 may normalize the request routings 260 based on the device type 222. For example, BIVL televisions are far less prevalent than PS3s. Consequently to ensure adequate testing of BIVL televisions, the routing configurations 220 associated with the BIVL television could include the RPM 232 of 1,000 and the routing configurations 220 associated with the PS3 could include the RPM 232 of 10. The routing configurations 220 may be generated in any technically feasible fashion and in any format. For example, in some embodiments an event stream processing system may create a relative ranked distribution of the device types 222 and the service provider may determine the RPMs 232 based on this ranked distribution. In other embodiments, the TTL 232 may be fined-tuned per routing configuration 220 to approximately capture entire sessions for different client flows associated with different device types 222.

In operation, upon receiving the request 210, the sticky canary router 130 determines the type of the client device that issued the request 210 based on the device ID 216. Subsequently, the sticky canary router 130 performs one or more comparison operations to identify the routing configuration 220 that includes the routing 226 of "canary" and the device type 222 that matches the type of the client device. The sticky canary router 130 then determines whether to route the request 210 to the canary cluster 160 based on the device ID 216 and the identified "canary" routing configuration 220.

If the sticky canary router 130 determines not to route the request 210 to the canary cluster 160, then the sticky canary router 130 performs comparison operations to identify the routing configuration 220 that includes the routing 226 of "baseline" and the device type 222 that matches the type of the client device. The sticky canary router 130 then determines whether to route the request 210 to the baseline cluster 150 based on the device ID 216 and the identified "baseline" routing configuration 220. As shown, the seed 236 included in the "canary" routing configuration 220(1) associated with the device type 222 "device A" differs from the seed 236 included in the "baseline" routing configuration 220(2) associated with the device type 222 "device A."

If, the sticky canary router 130 determines not to route the request 210 to either the canary routing cluster 260 or the baseline cluster 250, then the edge services cluster 210 routes the request 210 according to the default routing implemented in the edge services cluster 210—typically to the production cluster 140. In this fashion, the sticky canary router 130 and the edge services cluster 210 collaborate to route all the requests 210.

As part of determining whether to route the request 210 based on a particular routing configuration 220, the sticky canary router 130 computes the device hash 242, the time hash 246, and the routing hash 248. More specifically, based on the device ID 216, the sticky canary router 130 computes a consistent device hash 242. In operation, the sticky canary router 130 computes the same value of the device hash 242 for all the requests 210 received from a particular client device irrespective of the routing configuration 220. By contrast, the sticky canary router 130 computes two different values of the device hash 242 for two requests 210 received from different client devices. Accordingly, in some alternate embodiments, the sticky canary router 130 may compute the device hash 242 prior to identifying the canary routing configuration 220. The sticky canary router 130 may compute the device hash 242 in any technically feasible fashion that deterministically returns a consistent value for each value of the device ID 216. For example, in some embodiments, the sticky canary router 130 may perform a hashing operation or a cyclic redundancy check (CRC) operation on the device ID 216.

Based on the TTL 234 and the seed 236, the sticky canary router 130 is configured to compute the time hash 246 consistently for a time duration that equals the TTL 234. For example, if the TTL 234 is ninety seconds and the seed 236 is "canary seed," then the sticky canary router 130 could compute the time hash 246 as "first canary time segment" for ninety seconds. Subsequently, for the next ninety seconds, the sticky canary router 130 could compute the time hash 246 as "second canary time segment," and so forth. Since the seed 236 may be defined separately for each of the routing configurations 220, the time hash 246 may vary based on the routing configuration 220 regardless of whether the TTLs 234 of the routing configurations 220 are equal.

The sticky canary router 130 may compute the time hash 246 in any technically feasible fashion that, for a particular seed 236, ensures the time hash 246 is a consistent value for a time segment of a duration that equals the TTL 234. For example, as shown, the sticky canary router 130 could implement the following equation:

$$\text{time hash 246} = \text{floor}(\text{current\_time\_since\_epoch}(\ )/\text{TTL 234}) * \text{seed 236} \qquad 1.$$

The TTLs 234 are synchronized via the Network Time Protocol (NTP) that ensures that server time is consistent across servers, clusters, and regions. Consequently, equation 1 is valid across the servers and the clusters of servers.

The sticky canary router 130 leverages the device hash 242 and the time hash 246 to compute the routing hash 248. In general, for the device ID 216 and the routing configuration 220, the sticky canary router 130 is configured to consistently compute a single, unique value for the routing hash 248 during a time interval of duration equal to the TTL 234. The sticky canary router 130 may compute the routing hash 248 in any technically feasible fashion that complies with the aforementioned properties of the routing hash 248. For example, as shown, the sticky canary router 130 could perform a hashing operation, such as a hash list operation, on the device hash 242 and the time hash 246. In alternative embodiments, the sticky canary router 130 could perform a CRC operation on the device hash 242 and the time hash 246. In yet other embodiments, the sticky canary router 130 could perform a multiplication operation between the device hash 242 and the time hash 246.

After computing the routing hash 248 for the request 210, the sticky canary router 130 determines whether to route the request 210 based on the RPM 232. In particular, the sticky canary router 130 performs a modulo operation on the routing hash 248 and the value one million to determine a modulus. The sticky canary router 130 then compares the modulus to the RPM 232. If the modulus is less than the RPM 232, then the sticky canary router 130 routes the request 210 based on the routing 226 included in the routing configuration 220. For example, if the value of the routing 226 is "canary," then the sticky canary router 130 routes the request 210 to the canary cluster 160.

Notably, for the time window specified by a given TTL 324, the consistent value of the routing hash 240 ensures that the sticky canary router 130 provides a "sticky" routing for each of the client devices. More specifically, for a given TTL 324, the sticky canary router 130 routes the requests 210 received from canary client devices to the canary cluster 160 and routes the requests 210 received from baseline client devices to the baseline cluster 150. The edge services cluster 120 routes requests 210 received from the remaining client devices—the production client devices—to the production cluster 140. Further, the RPM 232 controls the percentage of the canary client devices and the baseline client devices relative to the total number of client devices. In this fashion, the sticky canary router 130 isolates the requests that are received from the canary client devices from the baseline software for the duration of the TTL. Consequently, the baseline software does not mask the effects of the service software update on the canary client devices.

Figure 3:
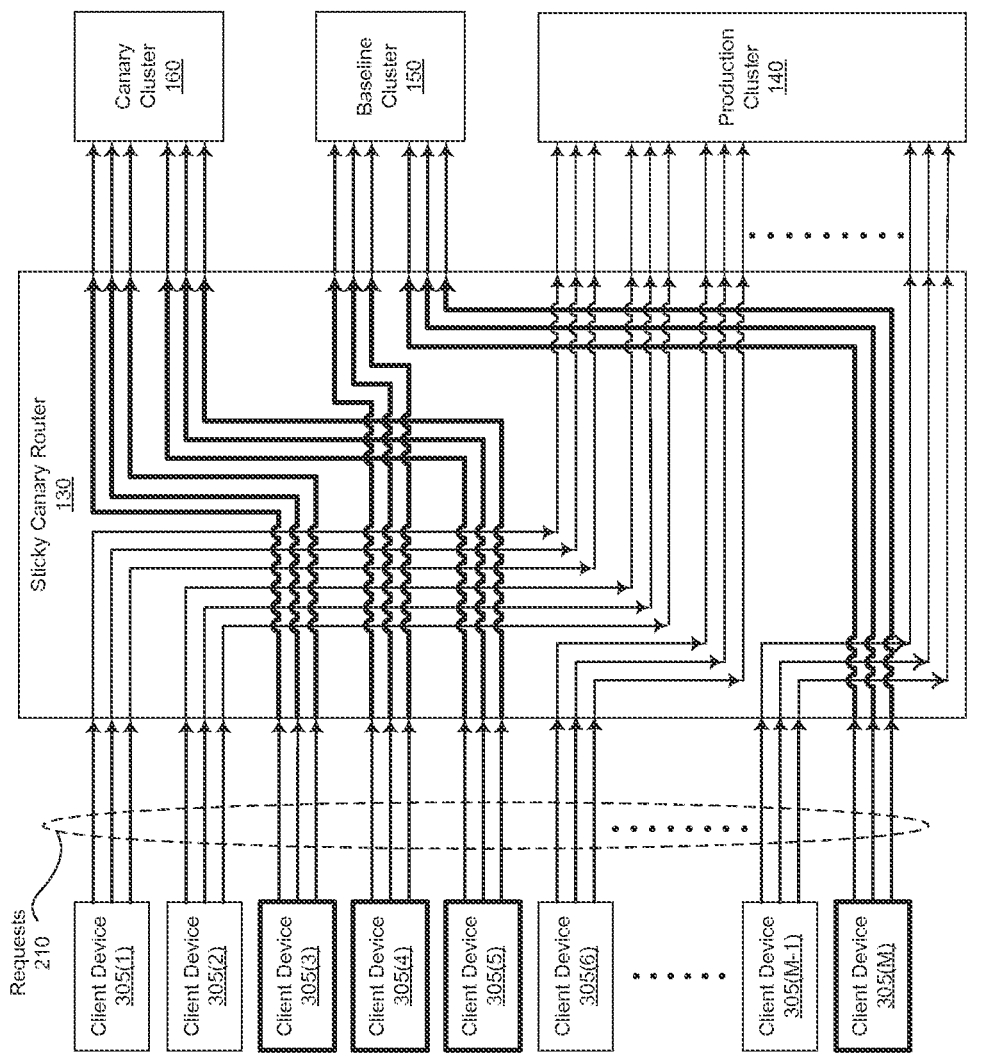
FIG. 3 is an example of routings implemented by the sticky canary router of FIG. 2, according to various embodiments of the present invention.

FIG. 3 is an example of routings generated by the sticky canary router 120 of FIG. 2, according to various embodiments of the present invention. The context of FIG. 3 is that the requests 210 are received from client devices 305 and, based on the routing configurations 220 (not shown in FIG. 3), the sticky canary router 130 routes each of the requests 210 to one of the canary cluster 160, the baseline cluster 150, or the production cluster 140.

For explanatory purposes only, the requests 210 are considered to be received by the sticky canary router 120 within the TTL 234 included in the routing configurations 220. Accordingly, the sticky canary router 120 routes all the requests 210 received from a particular client device 305 in a consistent fashion to the canary cluster 160, the baseline cluster 150, or the production cluster 140. More specifically, as shown, the sticky canary router 120 routes all the requests 210 received from the client devices 305(3) and 305(5) to the canary cluster 160. By contrast, the sticky canary router 120 routes all the requests 210 received from the client devices 305(4) and 305(M) to the baseline cluster 150. The sticky canary router 120 passes all the requests 210 received from the remaining client devices 305 to the edge services cluster 120, and the edge services cluster 120 routes these requests 210 to the production cluster 140.

Figure 4:
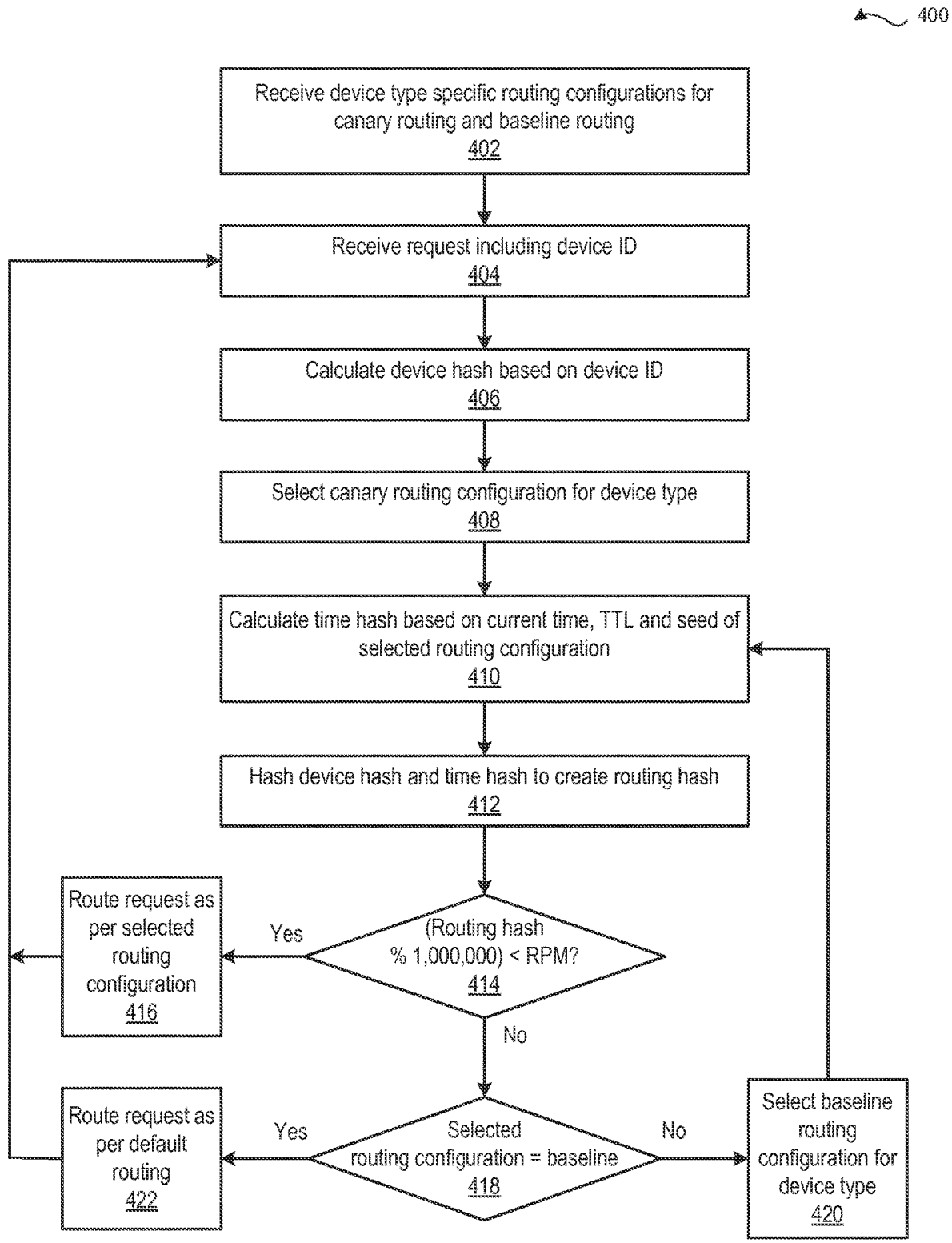
FIG. 4 is a flow diagram of method steps for routing requests when performing a canary analysis of software updates associated with a service, according to various embodiments of the present invention.

FIG. 4 is a flow diagram of method steps for routing requests when performing a canary analysis of software updates associated with a service, according to various embodiments of the present invention. Although the method steps are described with reference to the systems of FIGS. 1-3, persons skilled in the art will understand that any system configured to implement the method steps, in any order, falls within the scope of the present invention.

As shown, a method 400 begins at step 404, where the sticky canary router 130 receives the routing configurations 220. For each of the device types 222, the sticky canary router 130 receives two routing configurations 220. The routing configuration associated the canary cluster 260 is indicated by the value of "canary" for the routing 226. By contrast, the routing configuration 220 associated with the baseline cluster 250 is indicated by the value of "baseline" for the routing 226. At step 406, the sticky canary router 130 receives the request 210. The request 210 includes the device ID 216 of the client device 305 that issued the request 210. At step 406, the sticky canary router 130 calculates the device hash 242 based on the device ID 216.

At step 408, the sticky canary router 130 selects the routing configuration 220 that includes the routing 226 of "canary" and the device type 222 that matches the type of the client device 305. The sticky canary router 130 may obtain the type of the client device 305 in any technically feasible fashion. For example, in some embodiments the type of the client device is embedded in the device ID 216. At step 410, the sticky canary router 130 calculates the time hash 246 based on the current time, the TTL 234 included in the selected routing configuration 220, and the seed 236 included in the selected routing configuration. As detailed previously herein, the sticky canary router 130 may compute the time hash 246 in any technically feasible fashion that ensures that, for the seed 236, the time hash 246 is a consistent value for a time segment of a duration that equals the TTL 234.

At step 412, the sticky canary router 130 performs a hashing operation on the device hash 242 and the time hash 246 to compute the routing hash 248. Notably, for the device ID 216 and the selected routing configuration 220, the sticky canary router 130 is configured to consistently compute a single, unique value for the routing hash 248 during a time interval of duration equal to the TTL 234. At step 414, the sticky canary router 130 compares performs a modulo operation on the routing hash 248 and the value one million to determine a modulus. The sticky canary router 130 then compares the modulus to the RPM 232 included in the selected routing configuration 220. If, at step 414, the sticky canary router 130 determines that the modulus is less than the RPM 232, then the method 400 proceeds to step 416.

At step 416, the sticky canary router 130 routes the request according to the selected routing configuration 220. More specifically, if the value of the routing 226 included in the selected routing configuration 220 is "canary," then the sticky canary router 130 routes the request to the canary cluster 160. By contrast, if the value of the routing 226 included in the selected routing configuration 220 is "baseline," then the sticky canary router 130 routes the request to the baseline cluster 150. The method 400 then returns to step 404, where the sticky canary router 130 receives a new request 210.

If, however, at step 414, the sticky canary router 130 determines that the modulus is not less than the RPM 232, the then method 400 proceeds directly to step 418. At step 418, the sticky canary router 130 determines whether the selected routing configuration 220 is the baseline routing configuration 220 for the device type of the client device 305. More precisely, the sticky canary router 130 determines whether the value of the routing 226 is "baseline." If the sticky canary router 130 determines that value of the routing 226 is not "baseline," then the method 400 proceeds to step 420.

At step 420, the sticky canary router 130 selects the routing configuration 220 that includes the routing 226 of "baseline" and the device type 222 that matches the type of the client device 305. The method 400 then returns to step 410, and the sticky canary router 130 determines whether to route the request 210 to the baseline cluster 150 based on the selected baseline routing configuration 220 and the device ID 216 of the client device 305.

If, however, at step 418, the sticky canary router 130 determines that the value of the routing 226 is "baseline," then the method 400 proceeds directly to step 422. At step 422, the edge services cluster 120 routes the request 210 according to the default routing algorithm implemented in the edge services cluster 120. Typically, the edge services cluster 120 routes the request 210 to the production cluster 140. The method 400 then returns to step 404, where then sticky canary router 130 receives a new request 210.

The sticky canary router 130 continues in this fashion, cycling through steps 404-422, until the sticky canary router 130 determines that the canary analysis is finished. The sticky canary router 130 may determine that the canary analysis is finished in any technically feasible fashion. For example, the sticky canary router 130 could be configured to terminate the canary analysis after ten minutes.

In sum, the disclosed techniques may be used to efficiently detect defects introduced by a software update associated with a service while minimizing the impact of the defects on the clients. In operation, for each device type, a sticky canary router establishes a canary percentage, a baseline percentage, and time segments of a duration that equals a pre-determined time-to-live. Notably, the time-to-live is configured to capture approximately full sessions of client interactions with the service. For all client devices of a particular device type, within a specific time segment, the sticky canary router consistently routes requests from the canary percentage of the client devices, referred to herein as the canary client devices, to a canary cluster of servers that execute the software update associated with the service. By contrast, within the specific time segment, the sticky canary router consistently routes requests from the baseline percentage of client devices, referred to herein as the baseline client devices, to a baseline cluster of servers that execute baseline software associated with the service that does not include the software update.

Notably, because the sticky canary router isolates the requests that are received from the canary client devices from the baseline software for the duration of the TTL, the baseline software does not mask the effects of the service software update on the canary client devices. Consequently, data from the servers and devices may be analyzed to detect anomalies that indicate that the software update may adversely affect any number and type of client devices.

Advantageously, because the sticky canary router may be configured to route requests to the canary cluster of servers for approximately full sessions, the effects of the changes to the existing service on both the client experience and the server behavior may be more comprehensively analyzed relative to conventional approaches. In particular, since the sticky canary router prevents the canary client devices from accessing the baseline software for the duration of the TTL, the operations of the client devices may be impacted in a measurable manner. For example, if a defect introduced by the software update causes the canary servers to malfunction and issue responses to requests that the canary client devices are unable to interpret, then the canary client devices may retry the failed requests for the duration of the TTL. Consequently, the volume of requests received by the canary servers may dramatically exceed the volume of request received by the baseline servers, thereby indicating that the software update associated with the service included the defect.

Further, by selecting the canary percentage and/or the time-to-live based on the type of the client device, the sticky canary router enables fine-tuning of the canary analysis based on the relative prevalence of different device types and/or different expected session lengths. For example, suppose that client devices of a first device type are relatively prevalent while client devices of a second device type are relatively rare. To ensure that the second device type receives adequate canary testing, the canary percentage associated with the second device type may be set to a value that is 1000 times greater than the canary percentage associated with the first device type.

The descriptions of the various embodiments have been presented for purposes of illustration, but are not intended to be exhaustive or limited to the embodiments disclosed.

Many modifications and variations will be apparent to those of ordinary skill in the art without departing from the scope and spirit of the described embodiments.

Aspects of the subject matter described herein are set out in the following numbered clauses.

1. A computer-implemented method for routing requests when performing a canary analysis, the method comprising computing a first mapping based on at least one characteristic of a first request, a time associated with the first request, and a time window for a routing; determining whether the first mapping indicates that the first request is to be associated with a modification to a service provided via a plurality of servers; and routing the first request to either a first server that implements the modification or a second server that does not implement the modification based on whether the first mapping indicates that the first request is to be associated with the modification.

2. The computer-implemented method of clause 1, wherein the at least one characteristic of the first request comprises a device identifier, and computing the first mapping comprises performing a first hashing operation on the device identifier to generate a device hash; dividing a current time by the time window for the routing to determine a segment of time, wherein the time associated with the first request lies within the segment of time; performing a second hashing operation on the segment of time to generate a time hash; and performing a third hashing operation on the device hash and the time hash to generate the first mapping.

3. The computer-implemented method of either clause 1 or clause 2, wherein the time associated with the first request lies within a first segment of time, a duration of the first segment of time is equal to the time window for the routing, and further comprising receiving a second request, wherein at least one characteristic of the second request is equal to the at least one characteristic of the first request; and routing the first request to either a third server that implements the modification or a fourth server that does not implement the modification based on whether a time associated with the second request lies within the first segment.

4. The computer-implemented method of any of clauses 1-3, wherein computing the first mapping comprises performing at least one of a hashing operation and a cyclic redundancy check operation on a first characteristic of the first request, the time associated with the first request, and the time window for the routing.

5. The computer-implemented method of any of clauses 1-4, wherein the at least one of the hashing operation and the cyclic redundancy check is based on a unique constant that is associated with the modification.

6. The computer-implemented method of any of clauses 1-5, wherein the modification comprises a software update.

7. The computer-implemented method of any of clauses 1-6, wherein the at least one characteristic of the request comprises one of a device identifier, a client identifier, an electronic serial number, or a session identifier.

8. A program product comprising a computer-readable storage medium including instructions that, when executed by a processor, cause the processor to perform the steps of determining a percentage of mappings that are to be associated with a modification to a service based on a first characteristic of a first request; computing a first mapping based on a second characteristic of the first request, a time associated with the first request, and a time window for a routing; performing a comparison operation based on the first mapping and the percentage of mappings to determine whether the first mapping indicates that the first request is to be associated with the modification; and routing the first request to either a first server that implements the modification or a second server that does not implement the modification based on whether the first mapping indicates that the first request is to be associated with the modification.

9. The program product of clause 8, wherein computing the first mapping comprises performing at least one of a hashing operation and a cyclic redundancy check operation on the second characteristic, the time associated with the first request, and the time window for the routing.

10. The program product of either clause 8 or clause 9, wherein the at least one of the hashing operation and the cyclic redundancy check is based on a unique constant that is associated with the modification.

11. The program product of any of clauses 8-10, wherein the second characteristic comprises a device identifier, and computing the first mapping comprises performing a first hashing operation on the device identifier to generate a device hash; dividing a current time by the time window for the routing to determine a segment of time, wherein the time associated with the first request lies within the segment of time; performing a second hashing operation on the segment of time to generate a time hash; and performing a third hashing operation on the device hash and the time hash to generate the first mapping.

12. The program product of any of clauses 8-11, wherein the time associated with the first request lies within a first segment of time, a duration of the first segment of time is equal to the time window for the routing, and further comprising receiving a second request, wherein a first characteristic of the second request is equal to the first characteristic of the first request; and routing the first request to either a third server that implements the modification or a fourth server that does not implement the modification based on whether a time associated with the second request lies within the first segment.

13. The program product of any of clauses 8-12, wherein a difference between a start time and an end time equals the time window for the routing, and computing the first mapping comprises setting the first mapping equal to a first hash value, if a current time is greater than the start time and is not greater than the end time; or setting the first mapping equal to the second hash value, if the current time is not greater than the start time or is greater than the end time.

14. The program product of any of clauses 8-13, wherein the second characteristic of the request comprises one of a device identifier, a client identifier, an electronic serial number, or a session identifier.

15. The program product of any of clauses 8-14, wherein the second characteristic of the first request specifies that the first request is associated with a first client device, the first client device is associated with a first device type, and determining whether the first mapping indicates that the request is to be associated with the modification comprises performing a comparison operation based on the first mapping and a rate that specifies a percentage of client devices of the first device type that are to be associated with the modification.

16. The program product of any of clauses 8-15, further comprising setting the time window for the routing based on the first characteristic.

17. A system configured to route requests when performing a canary analysis, the system comprising a first server that implements a modification to a service; a plurality of servers that implement the service but do not implement the modification; and a sticky canary router configured to compute a first mapping based on at least one characteristic of a request; compute a second mapping based on a time associated with the request, a time window for a routing, and a unique constant that is associated with the modification; compute a third mapping based on the first mapping and the second mapping; determine whether the third mapping indicates that the request is to be associated with the modification; and route the request to either the first server or the plurality of servers based on whether the third mapping indicates that the request is to be associated with the modification.

18. The system of clause 17, wherein the sticky canary router is configured to compute the second mapping by dividing a current time by the time window for the routing to determine a segment of time, wherein the time associated with the request lies within the segment of time; and multiplying the segment of time and the unique constant to generate the second mapping.

19. The system of either clause 17 or clause 18, wherein the modification comprises at least one of a software update and a data update.

20. The system of any of clauses 17-19, wherein the at least one characteristic of the request comprises one of a device identifier, a client identifier, an electronic serial number, or a session identifier.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for routing requests when performing a canary analysis, the method comprising:
computing a first value based on at least one characteristic of a first request, a time associated with the first request, and a time window for routing the first request by performing at least one of a hashing operation or a cyclic redundancy check operation on a first characteristic of the first request, the time associated with the first request, and the time window for routing the first request, wherein the at least one of the hashing operation or the cyclic redundancy check operation is based on a unique constant that is associated with the modification;
determining whether the first value indicates that the first request is to be associated with a modification to a service provided via a plurality of servers; and
routing the first request to either a first server that implements the modification or a second server that does not implement the modification based on whether the first value indicates that the first request is to be associated with the modification.

2. The computer-implemented method of claim 1, wherein the first characteristic of the first request comprises a device identifier, and computing the first value further comprises:
performing a first hashing operation on the device identifier to generate a device hash;
dividing a current time by the time window for routing to determine a segment of time, wherein the time associated with the first request lies within the segment of time;

performing a second hashing operation on the segment of time to generate a time hash; and performing a third hashing operation on the device hash and the time hash to generate the first value.

3. The computer-implemented method of claim 1, wherein the time associated with the first request lies within a first segment of time, a duration of the first segment of time is equal to the time window for routing, and further comprising:

receiving a second request, wherein at least one device characteristic of the second request is equal to the at least one device characteristic of the first request; and routing the second request to either a third server that implements the modification or a fourth server that does not implement the modification based on whether a time associated with the second request lies within the first segment.

4. The computer-implemented method of claim 1, wherein the modification comprises a software update.

5. The computer-implemented method of claim 1, wherein the at least one device characteristic of the first request comprises at least one of a device identifier or an electronic serial number.

6. One or more non-transitory computer-readable storage media including instructions that, when executed by one or more processors, cause the one or more processors to perform the steps of:

determining a routing percentage that is to be associated with a modification to a service based on a first characteristic of a first request;

computing a first value based on a second characteristic of the first request, a time associated with the first request, and a time window for routing the first request by performing at least one of a hashing operation or a cyclic redundancy check operation on the second characteristic, the time associated with the first request, and the time window for routing the first request, wherein the at least one of the hashing operation or the cyclic redundancy check operation is based on a unique constant that is associated with the modification;

performing a comparison operation based on the first value and the routing percentage to determine whether the first value indicates that the first request is to be associated with the modification; and routing the first request to either a first server that implements the modification or a second server that does not implement the modification based on whether the first value indicates that the first request is to be associated with the modification.

7. The one or more computer-readable storage media of claim 6, wherein the second characteristic comprises a device identifier, and computing the first value further comprises:

performing a first hashing operation on the device identifier to generate a device hash;

dividing a current time by the time window for routing to determine a segment of time, wherein the time associated with the first request lies within the segment of time;

performing a second hashing operation on the segment of time to generate a time hash; and performing a third hashing operation on the device hash and the time hash to generate the first value.

8. The one or more computer-readable storage media of claim 6, wherein the time associated with the first request lies within a first segment of time, a duration of the first segment of time is equal to the time window for routing, and further comprising:

receiving a second request, wherein a first characteristic of the second request is equal to the first characteristic of the first request; and routing the second request to either a third server that implements the modification or a fourth server that does not implement the modification based on whether a time associated with the second request lies within the first segment.

9. The one or more computer-readable storage media of claim 6, wherein a difference between a start time and an end time equals the time window for routing, and computing the first value further comprises:

setting the first value equal to a first hash value, if a current time is greater than the start time and is not greater than the end time; or setting the first value equal to the second hash value, if the current time is not greater than the start time or is greater than the end time.

10. The one or more computer-readable storage media of claim 6, wherein the second characteristic of the first request comprises at least one of a device identifier or an electronic serial number.

11. The one or more computer-readable storage media of claim 6, wherein the second characteristic of the first request specifies that the first request is associated with a first client device, the first client device is associated with a first device type, and determining whether the first value indicates that the request is to be associated with the modification comprises performing a comparison operation based on the first value and a rate that specifies a percentage of client devices of the first device type that are to be associated with the modification.

12. The one or more computer-readable storage media of claim 6, further comprising setting the time window for routing based on the first characteristic.

13. A system configured to route requests when performing a canary analysis, the system comprising:

a first server, comprising a processor and memory, that implements a modification to a service;

a plurality of servers that implement the service but do not implement the modification; and an edge server comprising:
 a memory that stores instructions; and
 a processor that is coupled to the memory and, upon executing the instructions, performs the steps of:
  computing a first value based on a first characteristic of a request;
  computing a second value based on a second characteristic of the request, a time associated with the request, and a time window for routing the request by performing at least one of a hashing operation or a cyclic redundancy check operation on the second characteristic, the time associated with the request, and the time window for routing the request, wherein the at least one of the hashing operation or the cyclic redundancy check operation is based on a unique constant that is associated with the modification;
  computing a third value based on the first value and the second value;
  determining whether the third value indicates that the request is to be associated with the modification; and routing the request to either the first server or the plurality of servers based on whether the third value indicates that the request is to be associated with the modification.

14. The system of claim 13, wherein the edge server computes the second value by:
   dividing a current time by the time window for routing to determine a segment of time, wherein the time associated with the request lies within the segment of time; and
   multiplying the segment of time and the unique constant to generate the second value.

15. The system of claim 13, wherein the modification comprises at least one of a software update or a data update.

16. The system of claim 13, wherein the second characteristic of the request comprises at least one of a device identifier or an electronic serial number.

17. The computer-implemented method of claim 1, wherein the time window for routing the first request determines a routing of the first request to a particular server cluster of a plurality of server clusters.

18. The computer-implemented method of claim 1, wherein the time window for routing the first request allocates a first amount of time for routing the first request to a given server cluster included in a plurality of server clusters.

* * * * *